Figure 1:
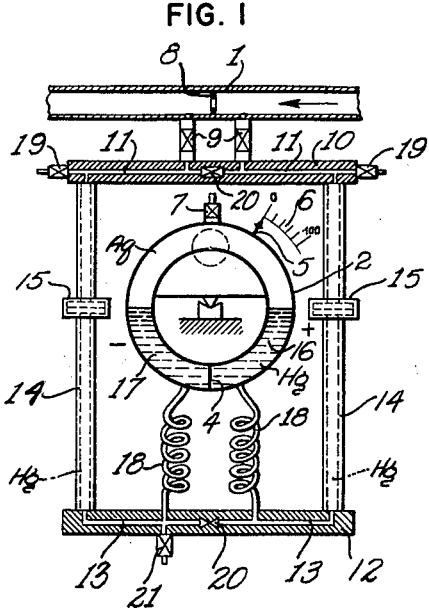

Feb. 22, 1955     A. LATERNSER     2,702,478

RING BALANCE

Filed Dec. 19, 1950

Inventor
Albin Laternser
by Morgan, Finnegan & Durham
Attorneys.

United States Patent Office 2,702,478
Patented Feb. 22, 1955

2,702,478

RING BALANCE

Albin Laternser, Horgen, Switzerland, assignor to Landis & Gyr, A. G., a body corporate of Switzerland Application December 19, 1950, Serial No. 201,550

Claims priority, application Switzerland December 27, 1949

4 Claims. (Cl. 73—405)

The present invention has for its object the provision of a novel and improved ring balance or differential manometer particularly adapted for measuring a greater range of pressures than is possible with conventional ring balances.

Objects and advantages of the invention will be set forth in part hereinafter and in part will be obvious herefrom, or may be learned by practice with the invention, the same being realized and attained by means of the instrumentalities and combinations pointed out in the appended claims.

The invention consists in the novel parts, constructions, arrangements, combinations and improvements herein shown and described.

The accompanying drawings, referred to herein and constituting a part hereof, illustrate several embodiments of the invention, and together with the description, serve to explain the principles of the invention.

Of the drawings:

Figures 1, 2, 3 and 4 are each schematic views showing different typical and illustrative embodiments of the present invention.

The present invention has for its object the provision of a novel and improved ring balance or differential manometer of relatively simple construction which is adapted to measure differences in pressure over a wide range with a high degree of accuracy. A further object is the provision of an improved ring balance to measure relatively great pressures and which is relatively simple in construction and compact in size. Still another object is the provision of a differential manometer which is extremely sensitive, is provided with a rotary member which may directly operate mechanical parts and may be simply and readily zeroized.

Float gauges or manometers which are generally used for measuring differences in the kinetic or static pressure of fluids or for measuring differences in volume can be used over a wide range of pressures by simply extending the length of the tubes forming the legs of the U-tube, at the expense of the bulk of the instrument, or by substituting a heavier liquid at the expense of the accuracy of the instrument. Ring balances as heretofore constructed have a limited range of pressures in which they are effective although they are very sensitive to minute changes in the pressure differential being measured by them.

The present invention provides a ring balance or differential manometer adapted for measuring differences in head or volume which offers the combined advantages of being useful in measuring ranges which exceed the normal range of ring balances, is much more compact than a conventional U-tube manometer suited to the same range, and at the same time retains the principle and many advantages of a ring balance. In certain respects, the present invention is an improvement on the instrument shown and described in my prior Patent No. 2,456,713 of December 21, 1948, but in other respects it is not so limited.

According to the present invention, there is provided a hollow generally annular or toroidal ring member having a single wall closing the interior of the ring, the single wall normally lying in the same vertical plane as the knife edge or other central pivot point about which the ring may turn. Two flexible tubes are connected to the hollow interior of the ring member, one on either side of the wall member and close together, the tubes preferably extending away from the ring in a generally vertical direction so that the gravitational or turning effect of the tubes on the rotation of the ring is minimized as the ring pivots about its center. The hollow interior of the ring member is filled with two immiscible liquids of widely different specific gravity, such as mercury and water, the hollow ring member being approximately half filled with each of the liquids, and one of the liquids normally lying equally on the two sides of the separating wall in the hollow ring member. The flexible tubes are connected to the two sources of pressure whose difference is to be measured, such for instance as the feed and return pressure of steam, or the feed and effluent pressure of a liquid passing some restriction, such connections preferably being made through the bottoms of each of two stationary standpipes which are partially filled with the heavier liquid used in the ring balance up to the normal level of the heavier liquid in the hollow ring. The hollow standpipes are preferably interconnected both above and below the level of the heavy liquid in them by means of suitable valving so that the pressure exerted on the upper face of the heavy liquid columns can be equalized and also so that the heights of the two columns of the heavy liquid can be equalized, while the hollow ring member itself is provided with valve means by which it may be filled with the light liquid or the position of the light liquid-heavy liquid interface can be adjusted so as to lie in the same horizontal plane as the pivot of the ring.

It will be understood that the foregoing general description and the following detailed description as well are exemplary and explanatory of the invention but are not restrictive thereof.

Referring now in detail to the present typical and illustrative embodiments of the invention as shown in the accompanying drawings, in which the preferred embodiment is shown in Figure 1, the various parts being shown schematically and with some parts in section:

In Figure 1 the ring balance of the present invention is shown as embodied in a compact unitary instrument wherein the stationary standpipes form the side framing of the instrument and the valving is incorporated in the top and bottom portions of the instrument frame. As embodied, the ring balance is adapted to measure the difference in the head of the liquid or fluid flowing under pressure in a pipe 1 past an obstruction 8 so that there is a wide difference in the head or kinetic pressure of the fluid on opposite sides of the obstruction.

The ring comprises a closed hollow and preferably circular annulus or toroidal member 2 provided with a horizontal support above its diameter on which support is carried a central pivot bearing or knife edge 3 seating in a suitable bearing seat fixed to the frame of the instrument and permitting the ring 2 to swing about its pivot as the two sides of the ring member 2 are subjected to unequal forces. Directly below the knife edge 3 and completely closing the hollow interior of the ring member 2 is a solid wall 4 which divides the lower half of the ring 2 into two equal halves. The solid wall 4 is preferably so positioned that in the zero position of the ring the wall is vertically alined with the pivot about which the ring member oscillates. Closely adjacent the wall 4 and extending downwardly therefrom in a generally vertical direction are two flexible connecting tubes 18 by which a heavy liquid, such as mercury, is supplied to or removed from one side of the wall 4 or the other, being added to the mercury body 16 as it is subtracted from the body 17, or vice versa.

The upper half of the ring member 2 is filled with a lighter liquid, such as water, the mercury-water interface on either side of the ring member 2 in zero position lying in the same horizontal plane as the pivot point of the ring. At the upper portion of the ring member 2 is provided a manually operated valve 7 connected to the interior of the ring 2 so that the proper quantity of water may be added or excess water may be removed. The ring member 2 is also preferably provided with a pointer member 5 which cooperates with a scale 6 to indicate the amount of rotation of the ring member about its pivot and thereby show the difference in kinetic or static pressure on the two sides of the obstruction 8.

At either side of the ring member 2 is a standpipe 14, one being connected with one side of the ring while the other is connected with the other side of the ring. Each of the standpipes 14 is provided with a hollow interior of substantially uniform diameter except for a portion adjacent the level of the mercury-water interface and at that portion each of the standpipes is formed with an enlarged and preferably cylindrical portion 15 to minimize the difference in level caused by differences in pressure and the flow of mercury and out of the standpipes. If desired, the lower portion of each of the enlarged portions 15 may be parabolically or otherwise curved to vary the uniform movement of the pointer 5 over the scale 6 in response to changes in pressure.

The standpipes preferably extend between the bottom base member 12 and the upper frame member 10 and interconnecting valves between the two sides of the ring are provided which are preferably integral with these frame members. As embodied, a passageway 13 formed in the base member 12 interconnects the standpipes 14 at their lower ends and is formed with lateral passages which are connected to the two tubes 18, while a central and normally closed valve member 20 is provided in the passageway 13 between the two connections to the flexible tubes 18. A drain valve 21 is also connected to the passageway 13 so that by opening the valves 7, 20 and 21, the entire system may be drained.

At their upper ends the standpipes 14 are connected to the frame member 10 which is formed with a passageway 11 having a central valve 20 between the lateral passageways which lead to the connections 9 by which the instrument is connected to the two different sources of pressure, and the extreme ends of the passageway 11 are connected to the valves 19, which may be opened to blow out the passageways, but are normally closed.

In the use of the instrument, the valves 7, 19, 20 and 21 are normally maintained closed, the mercury-water interfaces in the ring 2 and in both standpipes at their enlarged portions 15 lie in a horizontal plane with the wall 4 directly below the pivot 3 and with the lower halves of the ring 2 and the tubes 18 filled with mercury. As a pressure difference develops on the two sides of the obstruction 8, a greater pressure is applied to the heavy liquid in the right hand column 14 at the enlarged interface in portion 15 than to the similar interface in the left column 14, causing mercury to be fed through the right hand tube 18 to the body 16. Thereby, the volume of mercury 16 is enlarged causing the ring member 2 to swing in a clockwise direction and causing mercury to be withdrawn from the body 17 through the left tubing 18 and into the left column 14 until the mercury-water interfaces in the ring member 2 are substantially level with each other.

The volume of mercury displaced from the right hand tube 14 into the ring 2 is equal to the volume of mercury transferred from the ring 2 to the left hand tube 14, disregarding the effect of any counterbalance or spring member acting on the pivoted ring 2, so that in effect the ring 2 with its wall member 4 acts as a floating diaphragm permitting the volume of mercury in one tube 14 and the corresponding static head developed thereby to be changed correspondingly to the change of volume of mercury in the other tube 14. As a result, the maximum difference in pressure which may be registered by the ring balance is determined by the difference in static head between the columns of mercury in the two tubes 14, or approximately the full height of the tubes 14.

The enlarged portions 15 of the vertical standpipes 14 serve to vary the movement of the ring 2 for any given change in pressure and may be omitted or specially shaped, as desired. Also a counterweight 22 may be attached to the ring 2 and depending on its size and position, the movement of the ring 2 for any given change in pressure will be changed.

Figure 2:
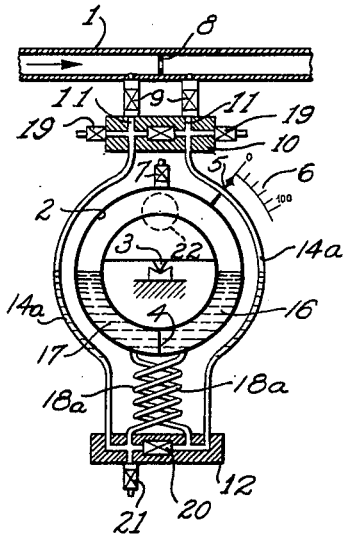

Figure 2 illustrates a modified embodiment of the invention according to which the standpipes 14a are of uniform internal diameter and are bent to conform generally to the exterior of the ring member 2. Also, in this embodiment, the flexible tubes 18 are formed as two coaxial helices to provide a relatively great length in a short vertical space and therefore greater flexibility to reduce their effect in interfering with rotation of the ring member 2. In this form, the enlarged portions 15 in the standpipes have been omitted and the deflection of the ring member 2 is thus almost linearly proportional to the pressure applied to the standpipe columns 14a.

Figure 3:
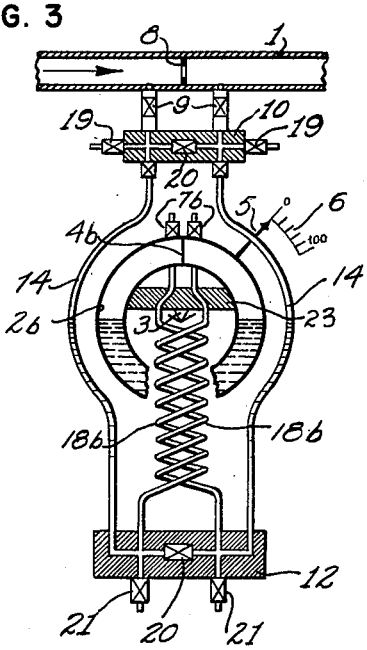

In the embodiment shown in Figure 3, most of the parts are duplicates of those shown in Figures 1 and 2, except that the flexible tubes 18b are here connected to the upper portion of the ring member 2b closely adjacent to the dividing wall 4b, which in this embodiment is positioned directly above the pivot point 3. Preferably, and to prevent overbalancing of the ring member 2b and rendering it unstable, the upper portions of the flexible tubes 18b are anchored in a transverse frame member 23 extending almost diametrically of the ring member 2b and supporting the knife edge 3, the under side of the frame member 23 being just above the knife edge 3. The upper portion of the ring member 2b is provided with bleed valves 7b one on either side of the dividing wall 4b.

Figure 4:
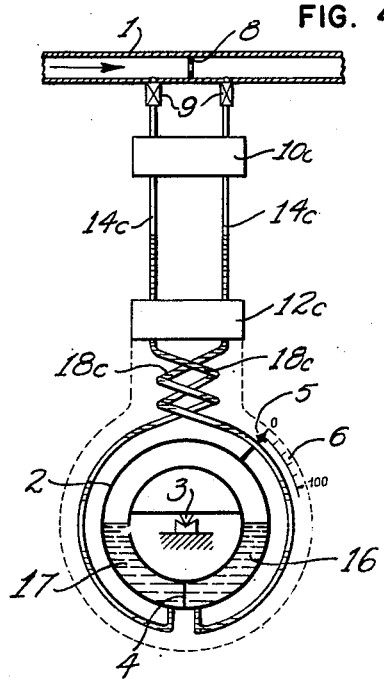

A fourth and somewhat simplified embodiment of the invention is shown in Figure 4 of the drawings. As embodied, the ring balance is adapted to measure even greater differences in pressure depending on the vertical distance between the ring balance and the pipe 1 in which the fluid under pressure is flowing. In this modified form of the invention, the ring member 2 may be of identical construction with that shown in Figures 1 and 2, and at its lower side is connected to the flexible tubes 18c which are curved to approximate the curvature of the ring member 2. They extend in a generally upward direction to a point where they are connected with a frame member 12c, which may be a duplicate of the frame member 12 in Figure 1, and in turn is connected to the two upwardly extending standpipes 14c which extend to an upper block 10c of a construction similar to that shown in Figure 1, and through which connection is made to the valves 9 and pipe 1, one such connection being made on either side of the obstruction 8. By extension of the standpipes 14, the possible difference in level of the two mercury-water interfaces is correspondingly extended and thereby the overall range of the ring balance is extended.

The operation of the embodiments shown in Figures 2, 3 and 4 has not been described, as they operate on the same principle as the embodiment of Figure 1, and will be obvious from the description of that operation.

The invention in its broader aspects is not limited to the specific mechanism shown and described but departures may be made therefrom within the scope of the accompanying claims without departing from the principles of the invention and without sacrificing its chief advantages.

What is claimed is:

1. An instrument for measuring differences in pressure by means of a ring balance, the pivoted ring member of which has a dividing wall and is filled partially with a heavier liquid and partially with a lighter liquid, said wall being in the bottom of and vertically aligned with the ring member pivot in the zero position of the ring including in combination a pair of tubular members each tubular member being arranged so as to have a lower end and an upper end, said tubular members being connected at their lower ends to the lower portion of the ring at opposite sides of the dividing wall and at their upper ends to the sources of pressure whose differences is to be measured, said lower ends being maintained in relatively fixed position and having means connecting them to the ring which permit the ring to rotate relative to the said lower ends while remaining connected thereto the lower portions of said tubular members being below said ring and each of the tubular members being partially filled with the heavier liquid whereby the dividing wall acts as a movable diaphragm.

2. An instrument as claimed in claim 1 in which the tubular members are connected to the ring member by flexible tubes which extend upwardly and are each helically coiled.

3. An instrument as claimed in claim 2 in which the flexible tubes are closely adjacent each other throughout their length and their helices are coaxial.

4. An instrument as claimed in claim 1 in which the dividing wall is normally below and vertically alined with the pivot of the ring member, the tubular members are connected at either side of the dividing wall by means of flexible tubes closely adjacent each other and the level of the heavier liquid in the ring member and in each of the tubular members is equal at zero pressure.

(References on following page)

References Cited in the file of this patent

UNITED STATES PATENTS

| | | |
|---|---|---|
| 387,877 | Herschel | Aug. 14, 1888 |
| 1,076,437 | Maplesden | Oct. 21, 1913 |
| 1,737,746 | Young | Dec. 3, 1929 |
| 1,880,213 | Rohlin | Oct. 4, 1932 |
| 2,333,834 | Vetter | Nov. 9, 1943 |
| 2,428,436 | Sperry | Oct. 7, 1947 |
| 2,509,327 | Young | May 30, 1950 |

FOREIGN PATENTS

| | | |
|---|---|---|
| 359,487 | France | Jan. 23, 1906 |
| 364,458 | Italy | Nov. 7, 1938 |